United States Patent [19]
Oulie

[11] Patent Number: 6,010,752
[45] Date of Patent: Jan. 4, 2000

[54] METHOD FOR COATING A PROFILED ELEMENT WITH AN AQUEOUS EMULSION OR DISPERSION

[75] Inventor: Michel Oulie, Issoire, France

[73] Assignee: Valeo Systemes D'Essuyage, La Verriere, France

[21] Appl. No.: 09/209,865

[22] Filed: Dec. 11, 1998

Related U.S. Application Data

[62] Division of application No. 08/874,155, Jun. 13, 1997, Pat. No. 5,883,168.

[30] Foreign Application Priority Data

Jun. 13, 1996 [FR] France .................................. 96.07332

[51] Int. Cl.⁷ ....................................................... B05D 3/12
[52] U.S. Cl. ........................ 427/365; 427/368; 427/393.5
[58] Field of Search ..................................... 427/365, 368, 427/393.5

[56] References Cited

U.S. PATENT DOCUMENTS

| | | | |
|---|---|---|---|
| 3,873,458 | 3/1975 | Parkinson | 428/219 |
| 4,209,332 | 6/1980 | Tsujio | 106/31.12 |
| 4,428,786 | 1/1984 | Arni | 264/312 |
| 4,857,578 | 8/1989 | Hall | 524/488 |
| 5,442,005 | 8/1995 | Brugarolas et al. | 524/276 |
| 5,447,645 | 9/1995 | Marshall . | |
| 5,631,313 | 5/1997 | Bishop et al. | 524/478 |

FOREIGN PATENT DOCUMENTS

| | | |
|---|---|---|
| 539 585 | 5/1993 | European Pat. Off. . |
| 562 191 | 9/1993 | European Pat. Off. . |
| 812876 | 12/1997 | European Pat. Off. . |
| 32 14267 | 10/1983 | Germany . |
| 58-042624 | 3/1983 | Japan . |
| 4-309534 | 11/1992 | Japan . |
| 1147577 | 4/1969 | United Kingdom . |

OTHER PUBLICATIONS

Database WPI Section Ch, Week 8332 Derwent Publications Ltd., London, GB; Class A82, AN 83–731276 XP002026918 & JP 58 109 542 A (Mikaki Paint KK), Jun. 29, 1983.

Database WPI Section Ch, Week 9617 Derwent Publications Ltd., London, GB; Class A14, AN 96–167292 XP002026919 & JP 08 048 800 A (Akurosu KK), Feb. 20, 1996.

Patent Abstracts of Japan vol. 010, No. 208 (C–361), Jul. 22, 1986 & JP 61 047737 A (Shimada Chiyanneru Seisakush-o:KK), Mar. 8, 1986.

*Primary Examiner*—Erma Cameron
*Attorney, Agent, or Firm*—Morgan & Finnegan LLP

[57] ABSTRACT

A profiled element for use as a wiping strip in a motor vehicle screen wiper is made of rubber or an elastomer, and has a coating formed by applying a solution to the profiled element. The solution comprises a powder of graphite for example, which is dispersed in a resin, and the solution includes a proofing agent for making the coating impermeable.

11 Claims, No Drawings

METHOD FOR COATING A PROFILED ELEMENT WITH AN AQUEOUS EMULSION OR DISPERSION

This is a divisional of application Ser. No. 08/874,155 filed Jun. 13, 1997, now U.S. Pat. No. 5,883,168.

FIELD OF THE INVENTION

The present invention relates to solutions, in particular solutions in the form of an emulsion, for use in forming a coating on a profiled element, the latter being made of rubber or an elastomeric material, the material of the coating being adapted to reduce the coefficient of friction between the profiled element and a surface of a glazing element such as a window glass. The invention also relates to a method for forming such a coating on a profiled element.

The profiled element is, by way of typical example, a wiping strip for a motor vehicle screen wiper in which the latter is made of rubber or of a natural or synthetic elastomer.

BACKGROUND OF THE INVENTION

In order to improve the quality of wiping performance obtained using a screen wiper having such a wiping strip, it is known to form a coating on the profiled element constituting the wiping strip, the coating comprising a powder, especially of crystalline graphite, in the form of very small particles, the purpose of which is then equivalent to that of a lubricant during wiping operation of the wiper. This does considerably improve the quality of wiping performance.

It is known to form such a coating using a solution which consists essentially of a binder in the form of an acrylic, vinyl or styrene resin, or urethane, in which the crystalline graphite powder is dispersed. The coating is formed by soaking the wiping strip in the solution, or by coating the strip with the solution, followed by drying.

Although such a coating improves the quality of wiping performance, it does have the disadvantage that it is particularly fragile, having a very low resistance to detergents and washing agents which are typically used, in particular, in the washing of vehicles. The lubricant coating therefore has a very short useful life, which leads rapidly in its deterioration or even to its complete disappearance, thus seriously reducing wiping quality.

DISCUSSION OF THE INVENTION

An object of the invention is to provide a novel composition for a solution for conversion into a lubricant coating of a profiled element, in particular for profiled elements consisting of wiping strips for motor vehicle screen wipers.

According to the invention, a solution of the type comprising a graphite powder dispersed in a resin is characterised in that it includes an agent for making the coating impermeable.

The agent for making the coating impermeable, which will be referred to herein as a proofing agent, confers hydrophobic properties on the coating. This gives it a highly satisfactory resistance to external attack, and in particular to detergents and other washing agents.

In a preferred embodiment of the invention, the proofing agent is an acrylic copolymer to which wax has been added. The proofing agent may also include isopropanol.

The resin which constitutes the binder of the solution, and which gives it its stregth after reticulation during the drying operation, preferably consists of an acrylic resin.

The solution may also include an emulsion stabilising agent, for example, and in particular, an alkaline agent, preferably ammonia.

In order to facilitate industrial use of the solution, it includes an agent for preventing the formation of foam during mixture of the constituents of the solution. This anti-foaming agent is for example a phosphoric ester based composition to which isobutanol and butylglycol may be added.

The powder preferably consists of a crystalline graphite powder.

DESCRIPTION OF A PREFERRED EMBODIMENT OF THE INVENTION

A preferred composition of a solution in accordance with the invention will now be described.

The solution, or emulsion, includes softened water having a substantially neutral pH, or non-ionised water, in a proportion of about 74% by weight. The resin employed is an acrylic resin which is sold commercially by the Protex company under the name ACRYMUL AMN 317R, which is incorporated in a proportion substantially equal to 14.43% by weight.

The powder which is employed in the solution is a graphite powder of micron particle size under the reference ACHESON 545, the grain or particle size of which is, for 85% of the particles, smaller than 8 microns, the particles having a specific surface of $15 m^2/g$. This graphite powder is incorporated in the solution in a proportion substantially equal to 10.76% by weight.

The proofing agent incorporated in the solution in accordance with the invention consists for example of the product sold by the Protex company under the name DRYOL PA. The proofing agent is an acrylic copolymer with added wax, which also contains isopropanol, ammonia and styrene. The proofing agent is incorporated in the solution in a proportion substantially equal to 0.59% by weight.

In order to prevent foam from being formed in an excessively great amount during preparation of the solution in the form of an emulsion, an anti-foaming agent is incorporated in the solution. In this example, this anti-foaming agent is the product sold by the Protex company under the name MOUSSEX 581PL, which is a phosphoric ester to which isobutanol and butylglycol have been added. This anti-foaming agent is incorporated in a proportion substantially equal to 0.074% by weight.

The stabilising agent for the emulsoid solution is ammonia dosed to 20%. The ammonia is incorporated in the solution in a proportion substantially equal to 0.148% by weight.

All of the constituents which have been mentioned above are mixed together in the proportions indicated so as to give an emulsion in accordance with the invention, which is then applied on the wiping strip by any suitable method, for example by immersion of the wiping strip in a bath of the solution, or by coating the wiping strip with the solution, or by spraying the solution on to the wiping strip.

After this step of depositing the graphiting solution, a drying step is carried out. This causes the resin to be reticulated at low temperature, equal to about 70° C., with evaporation of the stabilising agent and the anti-foaming agent, which do not leave any residue in the resulting surface layer or coating of the wiping strip. It is a feature of the invention that this coating constitutes a surface layer which improves the coefficient of friction between the wiping strip and the surface to be swept by the wiper incorporating the wiping strip, and that this surface layer of the strip is impermeable.

The coating thus formed is insoluble, and it therefore has a substantially perfect resistance to detergents and washing agents such as those used during washing of the vehicle.

The invention is of course not limited to the preferred composition which has just been described by way of example. Thus for example, the binder consisting of the resin may for example be a vinyl based resin, or a resin based on any other synthetic macromolecular compound that is suitable for the purpose.

The proofing agent that enables a hydrophobic coating to be obtained may, in another version, be a substance based on silicone, fluorinated products, ethanolamine, or a hydroxide. However, these alternative products do have certain disadvantages as to their compatibility with other components of the solution and with the material of which the wiping strip is made.

The emulsion stabilising agent may consist of any alkaline product or by a sodium or potassium hyroxide, but it should be noted that these alternative products have the disadvantage that they lead to the formation of residues in the coating after reticulation.

In accordance with a further feature of the invention, the method for coating the profiled element with a coating that reduces the coefficient of friction between the profiled element and a glazed surface consists in making use of a solution according to the invention and may include a final step, after the drying step, of brushing the profiled element having its coating.

The brushing step is for example carried out by passing the profiled element longitudinally between two adjacent rotating brushes. These brushes are rotated in opposite senses or directions of rotation. The direction of rotation of each brush is preferably such that the brush, where it makes contact with the profiled element, does so in a linear direction opposed to the linear direction in which the profiled element is advanced between the brushes.

The complementary brushing step homogenises the surface coating of the profiled element, and prevents the coating having defects in its outward appearance, or other defects such as irregularities within its thickness, or indeed adhesion faults. In this connection, it is desirable to eliminate all of these defects, because where they exist they give rise to the risk of causing stripes to be produced during the wiping operation (where the profiled element is a screen wiper wiping strip); such force can also lead to local deposits of graphite on the glass being swept, and to other undesirable effects.

Thus, the brushing step removes any excess graphite, eliminates graphite particles which are adhering poorly to the profiled element, and homogenises the graphite particles, by orienting the graphite platelets in the same direction. The brushing operation also enables the presence of the coating to be seen, because brushing alters the appearance of the coating by changing its colour from matt black to a metallic grey shade.

The brushes may be replaced by brushing rollers made for example of felt or a suitable porous material. These rollers, if used, have profiles which are complementary to that of the profiled element being treated.

In another version of the method according to the invention, the brushing step may be replaced by an equivalent operation in which high pressure water jets are sprayed on the coated profiled element.

What is claimed is:

1. A method for coating a profiled element with a coating for reducing the coefficient of friction between the profiled element and a surface of a glazing element, the method comprising:

providing an emulsion comprising a resin a powder of an anti-friction material dispersed in the resin, a proofing agent for rendering the coating impermeable, a stabilizing agent comprising ammonia and an anti-foaming agent for inhibiting formation of foam during mixing of the constituents of the emulsion wherein the anti-foaming agent comprises a phosphoric ester composition;

applying the emulsion to the profiled element by an operation selected from the group consisting of painting the emulsion on to the profiled element, immersing the profiled element in the emulsion, and spraying the emulsion on to the profiled element; and drying the profiled element.

2. A method according to claim 1, further including, after the drying, brushing the profiled element.

3. A method according to claim 2, wherein the brushing comprises passing the profiled element longitudinally between two adjacent brushes rotating in opposite directions of rotation.

4. A method according to claim 2, in which, in the brushing, the profiled element is passed between the brushes in a first direction, the brushes being rotated in directions of rotation such as to make contact with the profiled element in a second direction opposite to the first direction.

5. A method according to claim 2, wherein the brushing is carried out by passing the profiled element between two rollers having profiles complementary to that of the profiled element.

6. A method according to claim 2, wherein the brushing is carried out by projecting high pressure water jets on to the profiled element.

7. A method according to claim 1, wherein the proofing agent is an acrylic copolymer with added wax.

8. A method according to claim 7, wherein the proofing agent includes isopropanol.

9. A method according to claim 1, wherein the resin is an acrylic resin.

10. A method according to claim 1, wherein the anti-foaming agent is a phosphoric ester with the addition of isobutanol and butylglycol.

11. A method according to claim 1, wherein the powder is crystalline graphite powder.

* * * * *